United States Patent

Gray

[11] Patent Number: 5,806,880
[45] Date of Patent: Sep. 15, 1998

[54] FRONTAL WEAKENING OF INVISIBLE AIR BAG DOOR COVER

[75] Inventor: John D. Gray, Union, N.H.

[73] Assignee: Davidson Textron Inc., Dover, N.H.

[21] Appl. No.: 719,004

[22] Filed: Sep. 24, 1996

[51] Int. Cl.$^6$ .................................................. B60R 21/20
[52] U.S. Cl. ........................................ 280/728.3; 280/732
[58] Field of Search ............................ 280/728.3, 728.1, 280/732, 731

[56] References Cited

U.S. PATENT DOCUMENTS

| | | | |
|---|---|---|---|
| 4,097,064 | 6/1978 | Ikawa et al. | 280/732 |
| 4,925,209 | 5/1990 | Sakurai | 280/732 |
| 5,035,444 | 7/1991 | Carter | 280/728.3 |
| 5,131,678 | 7/1992 | Gardner et al. | 280/732 |
| 5,154,444 | 10/1992 | Nelson | 280/732 |
| 5,316,335 | 5/1994 | Gray et al. | 280/728 B |
| 5,375,875 | 12/1994 | DiSalvo et al. | 280/728 B |
| 5,466,000 | 11/1995 | Leonard et al. | 280/728.3 |

Primary Examiner—Eric D. Culbreth
Attorney, Agent, or Firm—Reising, Ethington, Learman & McCulloch PLLC

[57] ABSTRACT

A cover assembly for concealing an automotive vehicle air bag restraint assembly with an air bag, an air bag housing and a gas generator located in the housing for supplying gas to the air bag in response to vehicle impact. The cover assembly includes an inner retainer panel secured between the air bag and a vehicle passenger compartment. An air bag door is mounted within an opening in the retainer panel. A hinge connects the door to the retainer panel and allows the door to swing open under the force of an inflating air bag. A foam layer is sandwiched between an outer skin and the retainer panel and extends across both the retainer panel and the air bag door. A weakened tear-seam is formed in an outer surface of the outer skin and runs parallel to and adjacent an edge of the door opposite the hinge. A rigid applique is supported in a layered disposition over the outer skin to conceal the weakened tear-seam from passenger compartment occupants.

24 Claims, 5 Drawing Sheets

FRONTAL WEAKENING OF INVISIBLE AIR BAG DOOR COVER

TECHNICAL FIELD

This invention relates generally to air bag restraint systems and more particularly to a cover assembly for concealing an air bag restraint system in a vehicle passenger compartment.

BACKGROUND OF THE INVENTION

Many passenger vehicles are equipped with supplemental inflatable restraints, i.e., air bags, for vehicle occupants. Many of these air-bag-equipped vehicles also include cover assemblies that conceal the supplemental restraints. For primarily aesthetic reasons, it is desirable for such cover assemblies to include continuously formed outer skins or covers that provide no outward indication that an air bag assembly is concealed beneath or behind.

When an air bag inflates in response to a vehicle collision, a continuously-formed outer skin must tear open through a wide range of temperatures to allow the inflating bag to expand into the passenger compartment in a predictable manner.

One such method of controlling outer skin tearing is to create a weakened tear seam by weakening a linear portion of the outer skin so that tearing will occur along that weakened line when the air bag inflates. Weakening is sometimes accomplished by such means as perforating, cutting or melting the outer skin prior to assembling the cover assembly. For example, U.S. Pat. No. 5,131,678, assigned to the assignee of the present application, discloses an air bag cover assembly that includes a weakened tear-seam formed in the outer surface of an outer skin prior to assembly by cutting. The '678 patent does not, however, provide for concealment of the weakened tear-seam from passenger compartment occupants.

Another method of controlling outer-skin tearing is to use one or more pressure-assist members such as cutters or tear edges. For example, U.S. Pat. No. 4,097,064 discloses a cover assembly with a rigid applique in the form of a semi-rigid pad that is supported in a layered disposition over an outer skin. A cutter is mounted on the inner surface of the semi-rigid pad with a sharp cutting edge extended inward toward the outer skin. Air bag inflation forces the outer skin outward into contact with the inwardly-directed cutter, cutting the outer skin and releasing the inflating air bag. The position of the cutter on the inner surface of the pad also serves to conceal the cutter from vehicle occupants.

The prior art also includes an air bag cover assembly that employs both outer-skin weakening and a tear edge positioned along the weakened tear seam. U.S. Pat. No. 5,375,875 discloses a cover assembly with a weakened tear-seam formed in the inner surface of an outer skin, and a tear edge on a cutter panel that swings outwardly under the force of air bag inflation to cut the outer skin along the weakened tear-seam. The weakened tear seam is concealed from passenger compartment occupants by positioning it on the inner surface of the outer skin.

It would be desirable to provide an air bag cover assembly that controls the tearing of a continuously-formed outer skin by weakening a tear seam in the outer surface of the skin while concealing the weakened seam from passenger compartment occupants.

SUMMARY OF THE INVENTION

In accordance with this invention a cover assembly is provided that conceals an air bag restraint assembly. The cover assembly includes a weakened tear-seam formed in the outer surface of an outer skin, and a rigid applique that is supported in a layered disposition over the outer skin to conceal the weakened tear-seam from passenger compartment occupants. The outer skin is supported in a layered disposition across an outer surface of an inner retainer panel. The retainer panel is secured between the air bag and a vehicle passenger compartment and has an opening defined by forward, side and rear inner edges. An air bag door is shaped to fill the retainer panel opening when the door is in a closed position. The door has a hinged rear outer edge pivotally connected to the retainer panel along the rear inner edge of the retainer panel opening to allow the door to swing outwardly and away from the closed position when the door is exposed to a deploying air bag. By concealing the weakened tear seam, the applique provides a more aesthetically-pleasing finished appearance while preventing tampering or access to the air bag compartment.

According to another aspect of the invention, a foam layer is supported in a layered disposition between the outer skin and the retainer panel and between the outer skin and the air bag door.

According to another aspect of the present invention, a rigid tear edge is disposed outside the outer skin and directly over and along the weakened tear-seam. The tear edge and weakened seam cooperate to insure predictable outer skin tearing in response to air bag inflation. The tear edge may be embedded within the tear seam.

According to another aspect of the present invention the tear edge is supported on the applique. Rather than requiring air bag expansion to propel a movable cutter into the outer skin as is shown in the prior art, the outer skin is, instead, propelled into a stationary tear edge that is fixedly mounted to a rigid applique.

Other aspects of the present invention include the applique being supported on the retainer panel, and the tear edge projecting integrally inwardly toward the weakened tear-seam from an inner surface of the applique. The tear edge may extend into and along the tear-seam.

Still another aspect of the present invention includes a tear edge supported on a separate tear bracket rather than on the applique. The tear bracket is supported on the retainer panel and extends along the weakened tear-seam between the applique and the outer skin. The tear edge may be positioned to project integrally inwardly toward the tear-seam from along the tear bracket, and may project into and along the tear seam.

Yet another aspect of the present invention provides that the weakened tear-seam be shaped as an inwardly-projecting corrugation or V-channel with tear edge extending into the corrugation. This arrangement promotes accurate tear control by insuring that the tear-seam will not be knocked out of alignment with the tear edge as the air bag inflates.

According to another aspect of the invention the foam panel is formed with a shallow elongated inward recess disposed between the applique and the retainer panel. The recess extends along and adjacent the weakened tear-seam and is shaped to receive the tear bracket in a counter-sunk disposition. This arrangement allows the applique to be mounted closer to the outer skin.

According to another aspect of the present invention, tear edge side pieces are mounted at opposite ends of the tear bracket in a perpendicular relationship to the main tear edge. The tear edge side pieces initiate and direct outer skin tearing along the sides of the air bag door.

One final aspect of the present invention includes a method for assembling an air bag cover that includes the step of weakening the outer skin during assembly by forcing a pressure assist member to cut into the outer surface of the outer skin as the pressure assist member is being attached to the air bag cover during assembly.

BRIEF DESCRIPTION OF THE DRAWINGS

To better understand and appreciate the invention, refer to the following detailed description in connection with the accompanying drawings.

DETAILED DESCRIPTION OF THE PREFERRED EMBODIMENT

Figure 1:
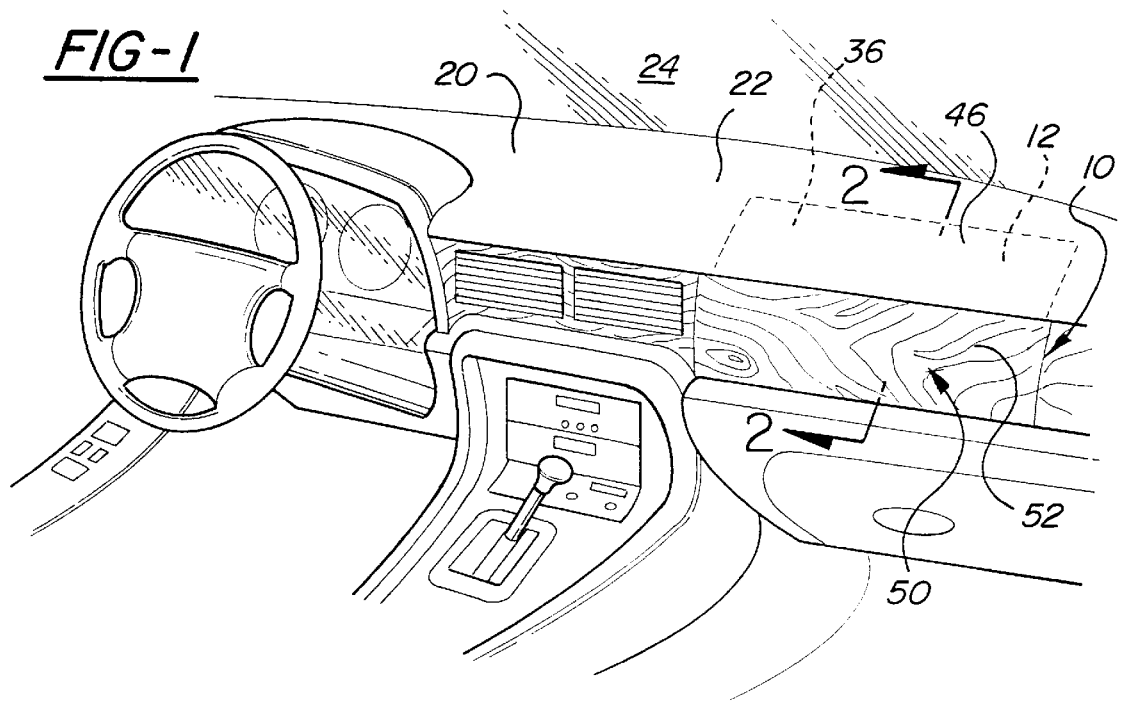
FIG. 1 is a perspective view of an air bag cover assembly constructed according to the invention and installed in a passenger vehicle interior.
Figure 2:
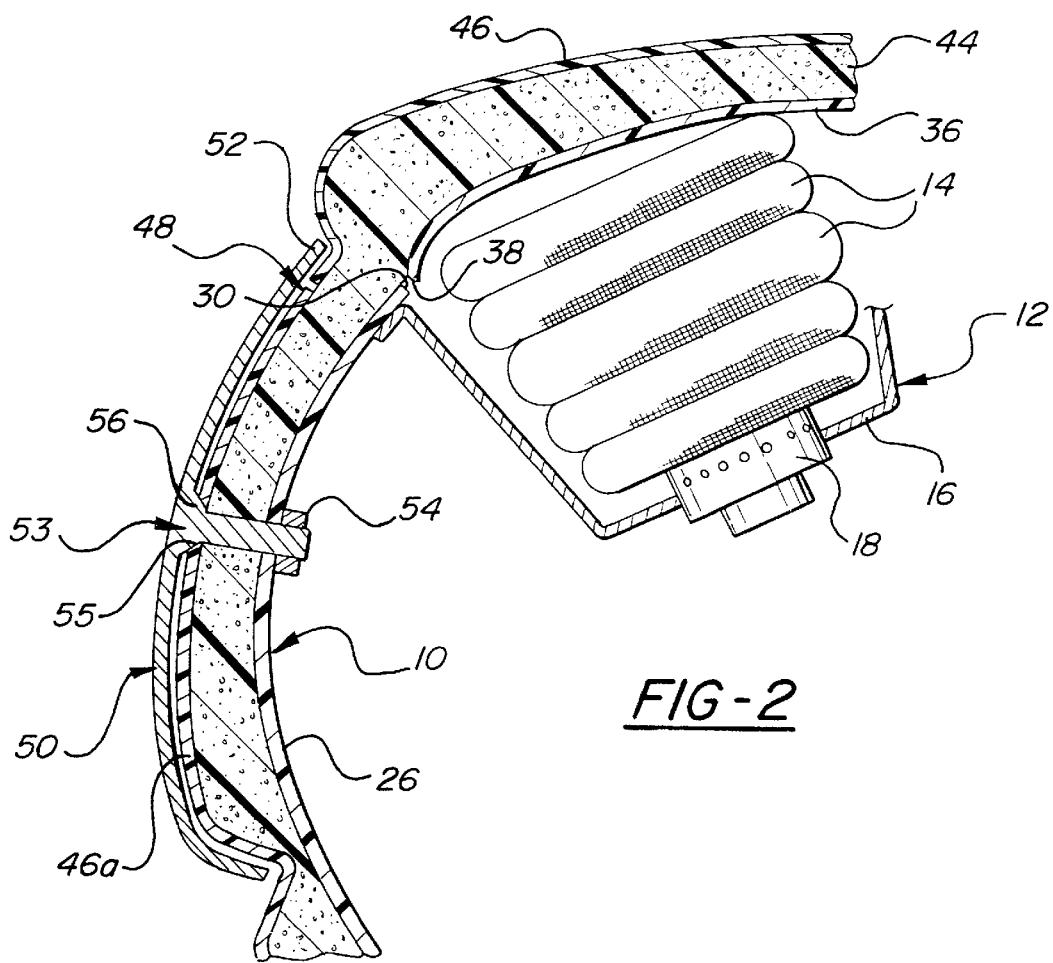
FIG. 2 is a cross-sectional end view of the cover assembly of FIG. 1 taken along line 2—2 of FIG. 1.

A cover assembly for concealing an automotive vehicle air bag restraint assembly is generally indicated at 10 in FIG. 1. As shown in FIG. 1, the cover assembly 10 is designed to be installed in the passenger compartment of an automobile. As shown in FIG. 2 the cover assembly 10 is designed to conceal an air bag restraint assembly 12. The air bag restraint assembly 12 includes an air bag 14, an air bag housing 16 and a gas generator 18 for supplying gas to the air bag 14 in response to vehicle impact. The air bag restraint assembly 12 may be constructed as set forth in U.S. Pat. Nos. 5,154,444 and 5,316,335, both of which are assigned to the assignee of the present application.

In FIG. 1 the cover assembly 10 and the air bag restraint assembly 12 are shown in a top-mount position with a hidden door 36 in an upper surface 20 of a dashboard 22 underlying a sloped front windshield 24. The cover assembly 10 may, alternatively, be adapted to cover an air bag restraint assembly 12 mounted in other than a top-mount position, e.g., a mid-mount position with the hidden door 36 located in the front surface of an instrument panel or dashboard 22.

The cover assembly indicated at 10 in FIG. 2 represents a first embodiment of the invention. A second embodiment is generally indicated at 10' in FIG. 4 and a third embodiment is generally indicated at 10" in FIG. 5. Reference numerals with the designation prime (') in FIG. 4 and the designation double-prime (") in FIGS. 5–7 indicate alternative configurations of elements that also appear in the first or second embodiment. Where a portion of the following description uses a reference numeral to refer to the figures, I intend that portion of the description to apply equally to elements designated by primed and double-primed numerals in FIGS. 4–7.

Referring to FIG. 2, the first embodiment comprises an inner retainer panel 26 that is adapted for securement between the air bag 14 and a vehicle passenger compartment. The retainer panel 26 is formed from a thin plastic panel but may, alternatively, be made of other suitably rigid materials. As is best shown in FIG. 3, the retainer panel 26 has a rectangular opening 28 defined by forward 30, side 32 and rear 34 inner edges.

Figure 3:
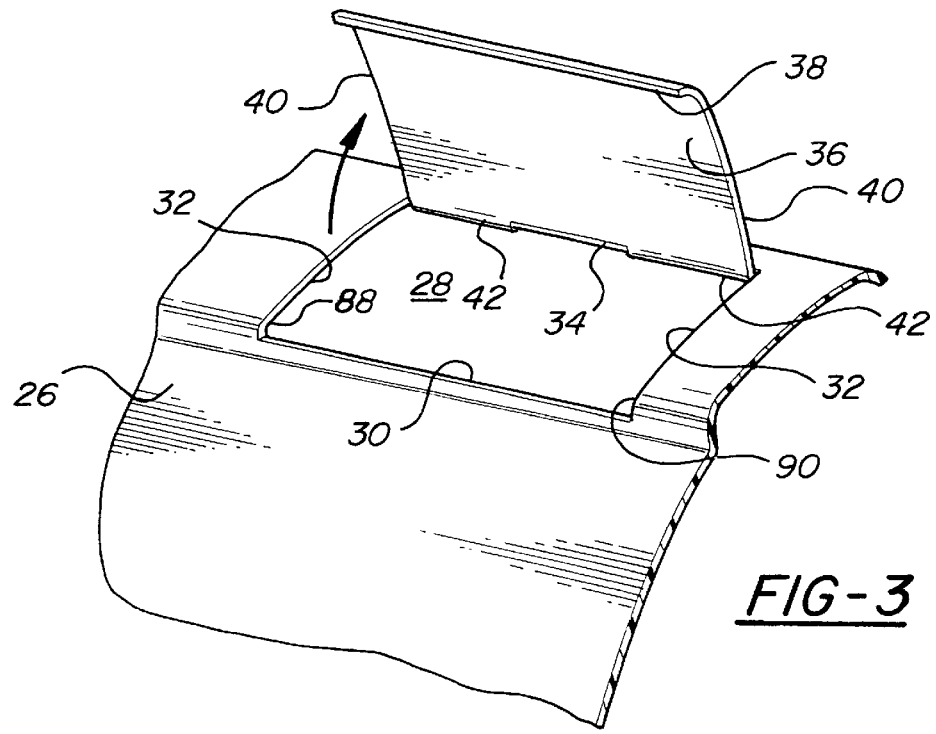
FIG. 3 is a perspective view of a retainer panel constructed according to the present invention with the air bag door shown in the open position.

Also shown in FIG. 3, in an open position, is a rectangular air bag door 36 that fits within the rectangular retainer panel opening 28 when the door 36 is in a closed position. The door 36 is formed from the same gauge plastic sheet that the retainer panel 26 is formed from. Therefore, when the door 36 is in its closed position, the door outer and inner surfaces lie flush with the retainer panel outer and inner surfaces. The door 36 has forward 38 and side 40 outer edges running adjacent and parallel to the respective forward 30 and side 32 inner edges of the retainer panel opening 28 when the door 36 is in the closed position. The door 36 has a rear hinge 42 that pivotally connects the door 36 to the retainer panel 26 along the rear inner edge 34 of the retainer panel opening 28. As shown in FIG. 3, this arrangement allows the door 36 to swing outwardly and away from the closed position when the door 36 is exposed to a deploying air bag 14. Alternatively, the rear hinge 42 may pivotally connect the door 36 to the air bag housing 16.

A layer 44 of energy-absorbing elastomeric foam, such as urethane foam, is supported in a layered disposition across and is bonded to an outer surface of the retainer panel 26. The foam layer 44 also extends across and is bonded to an outer surface of the air bag door 36. The foam layer 44 can be applied as described in U.S. Pat. No. 5,154,444 or by spraying or by being formed as a preform and then attached thereto. The foam may, alternatively, be supplied as part of the skin layer. Examples of such composite skin/foam structures include expanded vinyl sheet materials or polyvinylchloride (PVC)/polypropylene foam bilaminates.

The outer skin 46 is supported in a layered disposition on and is bonded to an outer surface of the foam layer 44. The outer skin 46 can be formed from cast vinyl material by processes such as those set forth in U.S. Pat. Nos. 4,664,864 and 4,784,911, both of which are assigned the assignee of the present application. The outer skin 46 may, alternatively, be formed from materials other than vinyl, such as thermoplastic polyolefins and thermoplastic urethanes that exhibit suitable flexibility and tear characteristics under a wide range of operating temperatures from below 0 degrees Fahrenheit to above 100 degrees Fahrenheit. Rather than being cast, the outer skin may also be sprayed-on or supplied as a sheet.

Figure 8:
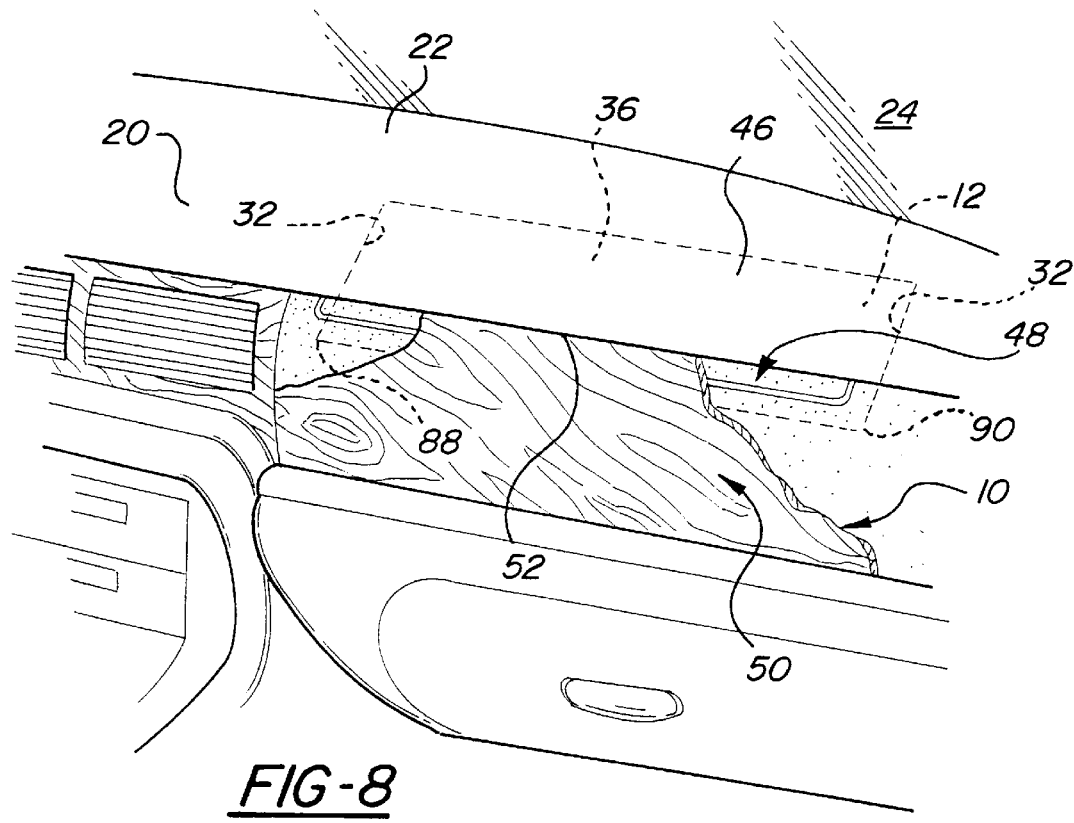
FIG. 8 is a perspective view of an air bag cover assembly constructed according to the first embodiment of the present invention with the applique partially cut-away.

A weakened tear-seam 48 is formed in an outer surface of the outer skin 46. The weakened tear-seam 48 runs parallel to and adjacent the forward outer edge 38 of the air bag door 36. As shown in FIG. 8, the weakened tear seam 48 turns at a point adjacent each of two forward corners 88, 90 of the retainer panel opening 28 and runs parallel to and along the sides 32 of the retainer panel opening 28. By running parallel to the sides 32 of the retainer panel opening 28, the tear seam 48 provides a guide to initiate and direct outer skin 46 tearing along the sides 32 of the retainer panel opening 28 when the air bag inflates and forces the air bag door 36 to open.

As shown in FIG. 2, the weakened tear-seam 48 of the first embodiment is an actual gap that is cut, melted or otherwise formed through the entire thickness of the outer skin 46. The weakened tear-seam 48 may, alternatively, comprise a row of closely-spaced perforations or a groove that has been cut, melted or otherwise formed part way into the outer surface or inner surface of the outer skin 46. Alternatively, the tear seam 48 can be shaped as a molded or cut V-groove or a series of spaced perforated holes formed by a laser beam or other known precision cutters such as water jets or the like.

The weakened tear seam 48 may be formed in the outer skin 46 either prior to, during or after the air bag cover 10 is assembled and either before, during or after the air bag cover assembly 10 is mounted over the air bag restraint assembly 12. Alternative to forming the tear seam 48 using the methods disclosed above, the tear seam 48 may instead be formed either independently or in some combination with a pressure-assist member, such as a cutter or tear edge, that is attached over the outer skin 46 during assembly. As the pressure-assist member is mounted, it forms the tear seam 48 as the pressure-assist member is forced into the outer surface of the outer skin 46. After the pressure-assist member has been secured in its assembled position, its cutting surface remains embedded within the tear seam 48 as shown in FIGS. 4, 4A, 4B and 5 or may completely sever the outer skin 46. Alternatively, the pressure-assist member may not engage the skin 46 upon attachment, but only upon deployment whereby the skin 46 is forced into the pressure-assist member.

As shown in FIGS. 1 and 2, a rigid applique 50 of extruded aluminum is supported in a layered disposition over the outer skin 46. A peripheral edge 52 of the applique 50 extends over and conceals the weakened tear-seam 48 from passenger compartment occupants. The applique 50 is spaced from the outer skin 46 and is shaped to match the contours of the skin 46 and to cover the front edge 38 to prevent tampering therewith so as to prevent access to the undeployed bag 14.

The applique 50 is supported on the retainer panel 26 by one or more tie-down posts 53. Through-holes for receiving the tie-down posts 53 extend through the skin 46, foam layer 44 and retainer panel 26. The tie-down posts 53 project integrally inward from a central portion of the retainer and pass through the through-holes. A distal end of each post 53 is adapted to receive a fastener 54. The fastener 54 may be any one of a number of suitable fasteners commonly known in the art such as screws, rivets, barbed fasteners and the like. In the illustrated embodiment, each post 53 has a tapered base 56 that engages a tapered outer end 55 of a through-hole in skin section 46a, preventing the applique 50 from contacting the outer skin 46, i.e., the tapered outer end 55 serves as a reference surface for spacing the applique 50 from the outer surface of the outer skin 46.

Variations on the first embodiment may include a retainer panel opening 28 that has a shape other than rectangular, an air bag door 36 that is formed from a different material than the retainer panel 26 or that has a thickness or gauge different from that of the retainer panel 26, or an applique 50 made of plastic or suitable metals.

Figure 4:
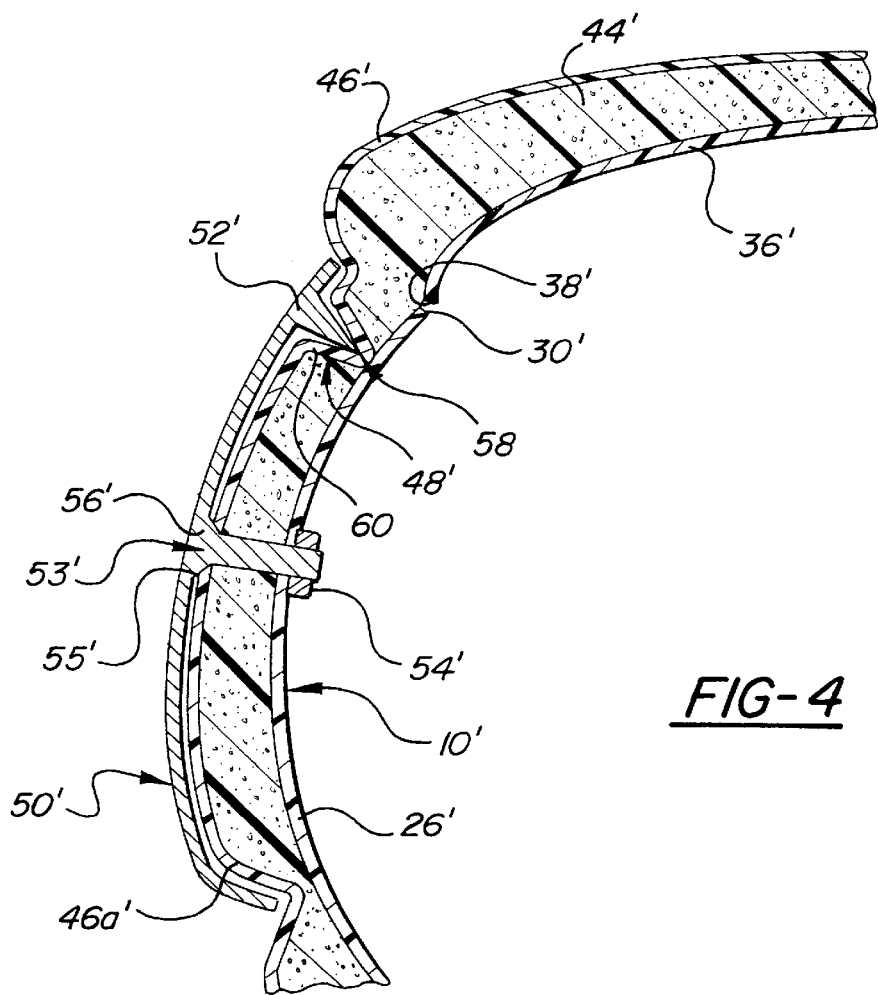
FIG. 4 is a cross-sectional end view of an air bag cover assembly constructed according to a second embodiment of the present invention.
Figure 9:
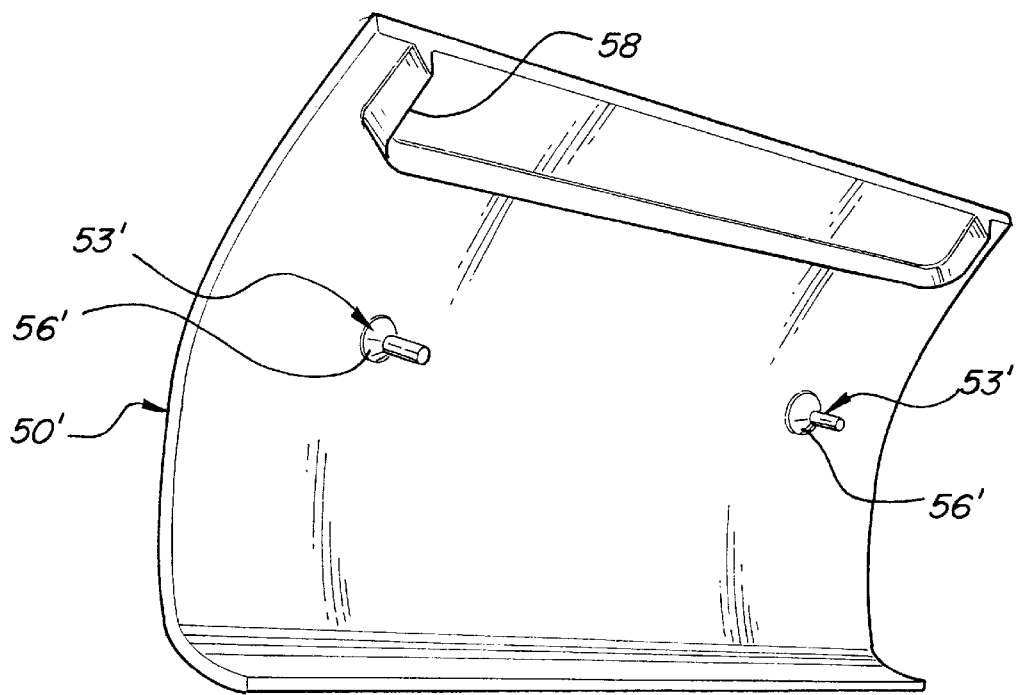
FIG. 9 is a rear perspective view of an applique constructed according to a second embodiment of the present invention.

As shown in FIG. 4, a second embodiment of the present invention includes a rigid elongated tear edge 58 that is disposed outside the outer skin 46' and is supported on the applique 50' in a position directly over and along the weakened tear-seam 48'. The tear edge 58 has a generally triangular cross-section, as shown in FIGS. 4 and 9, and runs the entire length of the weakened tear seam 48'. The tear edge 58 is extruded with the applique 50' so that the tear edge 58 and applique 50' form a single unitary extruded aluminum piece. The tear edge 58 projects integrally inwardly toward the weakened tear-seam 48' from an inner surface of the applique 50'. The tear edge 58 is supported in a generally perpendicular orientation in relation to the outer skin 46' and presents a relatively sharp, elongated cutting edge to the weakened tear-seam 48'. As shown in FIG. 9, the tear edge 58 turns at a point adjacent each of two forward corners 88, 90 of the retainer panel opening 28 and runs parallel and adjacent the sides 32 of the retainer panel opening 28. By running parallel to the sides 32 of the retainer panel opening 28, the tear edge 58 helps to initiate and direct outer skin 46 side-tearing when the air bag inflates and forces the air bag door 36 to open.

The weakened tear-seam 48' of the second embodiment comprises an inwardly-projecting corrugation 60. The tear edge 58 extends inwardly into the corrugation 60 and laterally along the length of the corrugation 60.

Figure 4A:
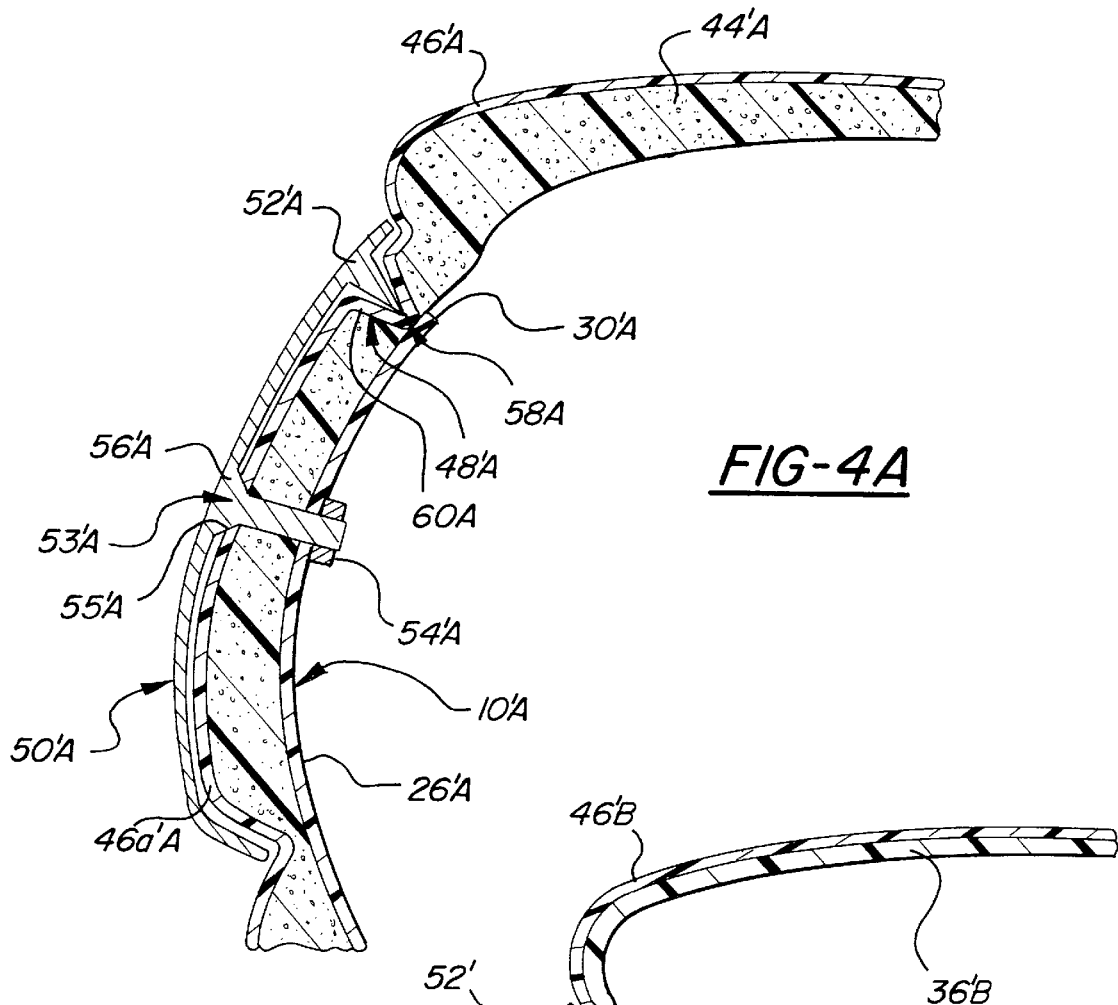
FIG. 4A is a cross-sectional end view of a first variant of the air bag cover assembly of FIG. 4.
Figure 4B:
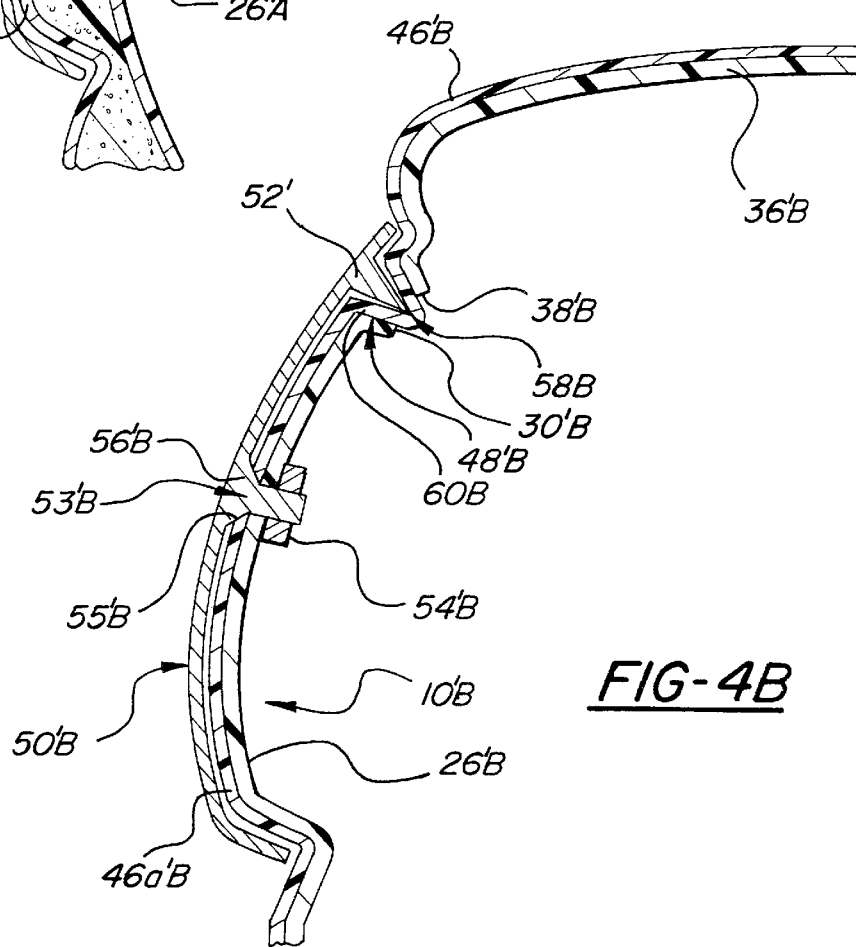
FIG. 4B is a cross-sectional end view of a second variant of the air bag cover assembly of FIG. 4.

A first variant of the second embodiment is generally indicated at 10'A in FIG. 4A and a second variant is generally indicated at 10'B in FIG. 4B. Reference numerals with the suffix "A" in FIG. 4A and the suffix "B" in FIG. 4B indicate alternative configurations of elements that also appear in the second embodiment. Where a portion of the preceding description uses a reference numeral to refer to the figures, that portion of the description applies equally to elements designated by the suffix "A" or "B" in FIGS. 4A and 4B.

As shown in FIG. 4A, the first variant of the second embodiment includes no air bag door 36'. Instead, a portion of the over-lying foam layer 44'A and a portion of the outer skin 46'A serve the function of an air bag door by concealing the air bag assembly and breaking open upon air bag inflation. The portion of the foam layer 44'A and outer skin 46'A that serves the function of an air bag door is that portion of each that overlies the retainer panel opening shown at 28 in FIG. 3 and, as shown in FIG. 4A, is disposed on the air bag side of the tear edge 58A. As the air bag inflates through the retainer panel opening 28 it forces the foam layer 44'A and outer skin 46'A outward against the tear edge 58A. The tear edge 58A cuts the outer skin 46'A and foam layer 44'A to form an escape door for the inflating air bag.

As shown in FIG. 4B, the second variant of the second embodiment includes no foam layer 44' between the outer skin 46'B and the retainer panel 26'B. Instead, the outer skin 46'B is bonded directly to the retainer panel 26'B and the air bag door 36'B. The forward outer edge 38'B of the air bag door 36'B and the forward inner edge 30'B of the retainer panel opening run adjacent and parallel to each other along opposite sides of the weakened tear seam 48'B. In response to air bag inflation, the air bag door 36'B is forced outward which forces the weakened tear seam 48'B of the outer skin 46'B into contact with the tear edge 58B. The tear edge 58B cuts the outer skin 46'B along the tear seam 48'B and initiates lateral tearing along the sides 32 of the retainer panel opening. This allows the air bag door 36'B to swing open, releasing the inflating air bag.

Other variants of the second embodiment may include a tear edge 58 formed separately of aluminum or other suitable materials and attached to the applique inner surface. In addition, the tear-seam may comprise a simple cut, gap or row of perforations alone in the outer skin 46 as described, above, with regard to the first embodiment, or it may act in combination with the tear edge 58. Also, the tear edge 58 may partially or fully sever the skin 46 prior to deployment upon its attachment.

Figure 5:
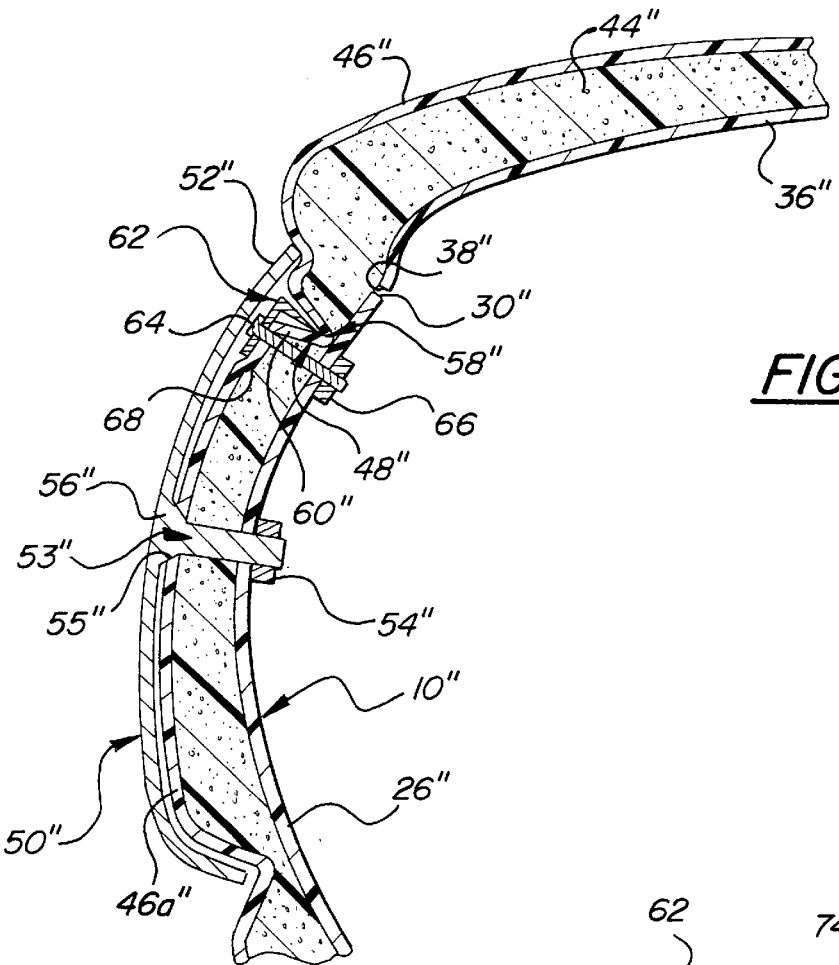
FIG. 5 is a cross-sectional end view of an air bag cover assembly constructed according to a third embodiment of the present invention.
Figure 6:
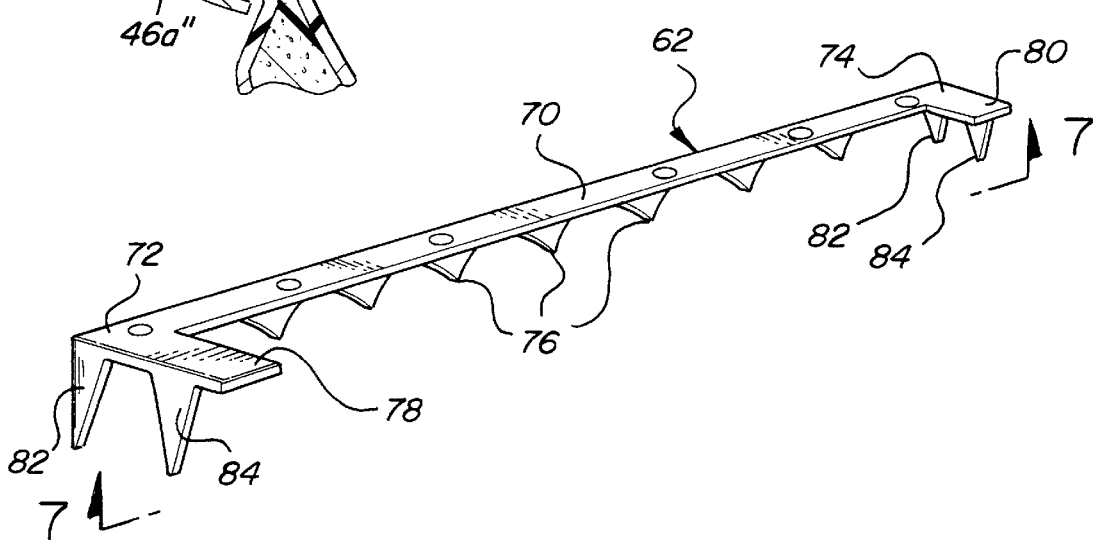
FIG. 6 is a perspective view of the tear edge bracket shown at 62 in FIG. 5.
Figure 7:
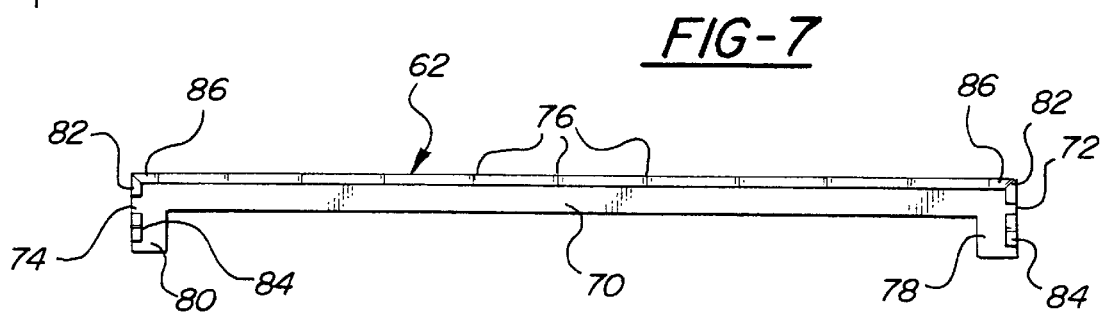
FIG. 7 is a bottom view of the tear edge bracket of FIG. 6.

According to a third embodiment of the invention shown in FIGS. 5–7, the tear edge 58" is supported on an elongated tear bracket 62 instead of being supported on the applique 50" as in the second embodiment. The tear bracket 62 is supported on the retainer panel 26" and supports the tear edge 58" in a position parallel to and adjacent the weakened tear-seam 48".

As with the second embodiment, the tear edge 58" projects integrally inward toward the weakened tear-seam 48" to present a relatively sharp, elongated cutting edge to the weakened tear-seam 48" with the tear edge 58" having a generally perpendicular orientation in relation to the outer skin 46". However, unlike the tear edge 58 of the second embodiment, the tear edge 58" of the third embodiment extends inwardly from along the tear bracket 62 instead of the applique 50" as is best shown in FIG. 5.

The tear bracket 62 and tear edge 58" are disposed behind a peripheral edge 52" of the applique 50" so that the applique 50" conceals the tear bracket 62 and tear edge 58" from occupants.

At least one fastener 64 is disposed between the tear bracket 62 and the retainer panel 26". The fasteners 64 pass through holes schematically shown in bar 70 in FIG. 6. Each fastener 64 has an outer end, or "head" connected to the tear bracket 62. The head holds the tear bracket 62 inward against the outer skin 46. An inner end of the fastener 64 is connected to the retainer panel 26" by well-known means such as the nut 66 shown in FIG. 5.

The foam panel 44" includes a shallow elongated inward recess 68 disposed between the applique 50" and the retainer panel 26" and along and adjacent the weakened tear-seam 48". The recess 68 is shaped to receive the tear bracket 62 in a counter-sunk disposition and the outer skin 46" is conformed to the shape of the recess 68. The tear bracket 62 is disposed along and within the recess 68. When the tear bracket 62 is mounted in the recess 68, the outer surface of the tear bracket 62 lies in a generally coplanar relationship with the outer surface of the outer skin 46".

As is best shown in FIGS. 6 and 7, the tear bracket 62 comprises an elongated bar 70 extending parallel to and adjacent the weakened tear-seam 48" between two bracket ends 72, 74. The tear edge 58" comprises a series of fillets or serrations which form peaks 76 along the length of the tear edge 58". The peaks 76 serve to puncture the outer skin 46 at spaced locations along the weakened tear seam 48".

The tear bracket 62 also includes first 78 and second 80 perpendicular extensions. The extensions 78, 80 integrally project from the bar ends 72, 74, respectively, and extend parallel to and adjacent the retainer panel opening side inner edges 32. As is best shown in FIG. 7, the bar 70 and the perpendicular extensions 78, 80 define an elongated u-shape.

At least one tear edge side piece 84 is supported on each of the two perpendicular extensions 78, 80. As shown in FIGS. 6 and 7, the third embodiment includes two tear edge side pieces, i.e., an inner 82 and an outer 84 tear edge side piece on each perpendicular extension 78, 80. The tear edge side pieces 82, 84 are triangular in shape. Each tear edge side piece 82, 84 is connected to the outer edge of a perpendicular extension 78, 80 along one triangular side of the respective side piece 82, 84. A triangular apex of each tear edge side piece 82, 84 extends inward from its respective perpendicular extension 78, 80. Each inner tear edge side piece 82 has the shape of a right triangle. Each inner tear edge side piece 82 is integrally formed as a unitary piece with one of the outermost peaks 86 of the main tear edge 58" to form a corner spike at each end of the tear bracket 62. The tear edge side pieces 82, 84 are supported on the perpendicular bracket extensions 78, 80 so as to be positioned along the outer skin 46" where the outer skin 46" covers the interface between the side inner edges 32 of the retainer panel opening 28 and the side outer edges of the air bag door 36. The tear edge side pieces are therefore positioned over this seam to initiate cover tearing along the air bag door side outer edges— allowing the air bag door 36" to open in response to air bag inflation.

Variations on the third embodiment may include the use of suitable fasteners other than fasteners 64 to attach the tear bracket 62 to the retainer panel 26". In addition, the tear edge 58" may comprise a single straight sharp cutting edge without fillets or may comprise any number of other cutting configurations as are commonly known in the art. Other variations may include more than two tear edge side pieces 82, 84 on each perpendicular extension 78, 80 and tear edge side pieces 82, 84 that are other than triangular in shape. The tear edge side pieces 82, 84 may, for example, comprise a continuous, straight cutting edge rather than a series of spikes or serrations.

This is an illustrative description of the invention using descriptive rather than limiting words.

Obviously, many modifications and variations of this invention are possible in light of the above teachings. Within the scope of the claims, one may practice the invention other than as described.

I claim:

1. In a cover assembly for concealing an automotive vehicle air bag restraint assembly, the restraint assembly including an air bag, an air bag housing and a gas generator located in the housing for supplying gas to the air bag in response to vehicle impact, said cover assembly including:

an inner retainer panel that is adapted for securement between the air bag and a vehicle passenger compartment, said retainer panel having an opening defined by forward, side and rear inner edges, an air bag door shaped to fill said retainer panel opening when said door is in a closed position, said door having forward and side outer edges running adjacent and parallel to said respective forward and side inner edges of said retainer panel opening when said door is in said closed position, said door having a hinged rear outer edge pivotally connected adjacent said rear inner edge of said retainer panel opening to allow said door to swing outwardly and away from said closed position when said door is exposed to the air bag when the air bag deploys; an outer skin supported in a layered disposition across an outer surface of said retainer panel and across an outer surface of said air bag door; a weakened tear-seam formed in said outer skin, said weakened tear-seam running parallel to and adjacent said forward outer edge of said door; the improvement comprising:

a rigid applique supported in a layered disposition over said outer skin and including an edge portion thereon covering said weakened tear-seam for concealing said weakened tear-seam; and a rigid tear edge disposed outside said outer skin and directly over and along said weakened tear-seam.

2. A cover assembly as defined in claim 1, wherein a portion of said tear edge extends into and along said weakened tear-seam.

3. A cover assembly as defined in claim 1, wherein a portion of said tear edge extends completely through said weakened tear-seam.

4. A cover assembly as defined in claim 1, wherein said tear edge is supported on said applique.

5. A cover assembly as defined in claim 4, wherein said applique is supported on said retainer panel.

6. A cover assembly as defined in claim 4, wherein said tear edge projects integrally inwardly toward said weakened tear-seam from an inner surface of said applique.

7. A cover assembly as defined in claim 6, wherein a portion of said tear edge extends into and along said weakened tear-seam.

8. A cover assembly as defined in claim 6, wherein a portion of said tear edge extends completely through said weakened tear-seam.

9. A cover assembly as defined in claim 1, further including an elongated tear bracket supported on said retainer panel, said tear bracket extending parallel to and adjacent said weakened tear-seam, said tear edge supported on said tear bracket.

10. A cover assembly as defined in claim 9, wherein said tear edge projects integrally inwardly toward said weakened tear-seam from along said tear bracket.

11. A cover assembly as defined in claim 10, wherein said tear edge extends into and along said weakened tear-seam.

12. A cover assembly as defined in claim 10 wherein a portion of said tear edge extends completely through said weakened tear-seam.

13. A cover assembly as defined in claim 9, wherein said tear bracket and tear edge are disposed behind said applique.

14. A cover assembly as defined in claim 9, further including a foam layer supported in a layered disposition across an outer surface of said retainer panel and across an outer surface of said air bag door, said outer skin supported in a layered disposition on an outer surface of said foam layer.

15. A cover assembly as defined in claim 14, wherein said foam layer includes a shallow elongated inward recess disposed between said applique and said retainer panel and along and adjacent said weakened tear-seam, said recess shaped to receive said tear bracket in a counter-sunk disposition, said tear bracket disposed along and within said recess with an outer surface of said bracket being generally coplanar with an outer surface of said outer skin.

16. A cover assembly as defined in claim 9, wherein said tear bracket extends between first and second ends, and where said cover assembly includes first and second tear edge side pieces supported on said respective first and second tear bracket ends, said side pieces including respective cutting edges positioned outside said outer skin and aligned along a plane extending perpendicularly outward from along said side outer edges of said air bag door.

17. A cover assembly as defined in claim 1, wherein said weakened tear-seam comprises an inwardly-projecting corrugation and where said tear edge extends into said corrugation.

18. A method for making a cover assembly for concealing an automotive vehicle air bag restraint assembly, the restraint assembly including an air bag, an air bag housing and a gas generator located in the housing for supplying gas to the air bag in response to vehicle impact, the cover assembly including an inner retainer panel that is adapted for securement between the air bag and a vehicle passenger compartment, the retainer panel having an opening defined by forward, side and rear inner edges; an air bag door shaped to fill the retainer panel opening when the door is in a closed position, the door having forward and side outer edges running adjacent and parallel to the respective forward and side inner edges of the retainer panel opening when the door is in the closed position, the door having a hinged rear outer edge pivotally connected adjacent the rear inner edge of the retainer panel opening to allow the door to swing outwardly and away from the closed position when the door is exposed to the air bag when the air bag deploys; an outer skin supported in a layered disposition across an outer surface of the retainer panel and across an outer surface of the air bag door; and a rigid tear edge disposed outside the outer skin; said method including the steps of:

forcing the tear edge into an outer surface of the outer skin to form a weakened tear-seam running parallel to and adjacent the forward outer edge of the door; and installing the tear edge outside the outer skin with a portion of the tear edge extending into and along the weakened tear-seam.

19. A method as set forth in claim 18 wherein said step of forcing the tear edge into the skin outer surface is performed during said step of installing the tear edge.

20. A method as set forth in claim 18 including the additional step of forcing the tear edge completely through the outer skin during said step of installing the tear edge.

21. A method for making a cover assembly for concealing an automotive vehicle air bag restraint assembly, the restraint assembly including an air bag, an air bag housing and a gas generator located in the housing for supplying gas to the air bag in response to vehicle impact, the cover assembly including an inner retainer panel that is adapted for securement between the air bag and a vehicle passenger compartment, the retainer panel having an opening defined by forward, side and rear inner edges; an air bag door shaped to fill the retainer panel opening when the door is in a closed position, the door having forward and side outer edges running adjacent and parallel to the respective forward and side inner edges of the retainer panel opening when the door is in the closed position, the door having a hinged rear outer edge pivotally connected adjacent the rear inner edge of the retainer panel opening to allow the door to swing outwardly and away from the closed position when the door is exposed to the air bag when the air bag deploys; an outer skin supported in a layered disposition across an outer surface of the retainer panel and across an outer surface of the air bag door; and a rigid tear edge disposed outside the outer skin; said method including the steps of:

providing a weakened tear-seam in an outer surface of the outer skin such that the seam runs parallel to and adjacent the forward outer edge of the door; and installing the tear edge outside the outer skin with a portion of the tear edge extending into and along the weakened tear-seam.

22. A method as set forth in claim 21 wherein said step of providing a weakened tear-seam includes the step of forcing the tear edge into the skin outer surface.

23. A method as set forth in claim 22 including the additional step of forcing the tear edge completely through the outer skin during said step of installing the tear edge.

24. A method as set forth in claim 22 where said step of providing a weakened tear-seam in the skin outer surface and said step of installing the tear edge are performed concurrently.

* * * * *